(12) United States Patent
Dronzek, Jr.

(10) Patent No.: US 10,902,749 B2
(45) Date of Patent: Jan. 26, 2021

(54) SELF SEALING TAG STOCK

(75) Inventor: Peter J. Dronzek, Jr., New Milford, CT (US)

(73) Assignee: POLYMERIC CONVERTING LLC, Enfield, CT (US)

( * ) Notice: Subject to any disclaimer, the term of this patent is extended or adjusted under 35 U.S.C. 154(b) by 229 days.

(21) Appl. No.: 13/529,912

(22) Filed: Jun. 21, 2012

(65) Prior Publication Data
US 2012/0328818 A1 Dec. 27, 2012

Related U.S. Application Data

(60) Provisional application No. 61/571,102, filed on Jun. 21, 2011.

(51) Int. Cl.
G09F 3/10 (2006.01)
C09J 7/29 (2018.01)
C09J 7/30 (2018.01)
C09J 7/22 (2018.01)
G09F 3/02 (2006.01)

(52) U.S. Cl.
CPC .......... G09F 3/10 (2013.01); C09J 7/22 (2018.01); C09J 7/29 (2018.01); C09J 7/30 (2018.01); C09J 2203/334 (2013.01); C09J 2301/162 (2020.08); G09F 2003/0254 (2013.01); Y10T 428/15 (2015.01); Y10T 428/24215 (2015.01); Y10T 428/24314 (2015.01); Y10T 428/28 (2015.01); Y10T 428/2843 (2015.01); Y10T 428/2848 (2015.01)

(58) Field of Classification Search
None
See application file for complete search history.

(56) References Cited

U.S. PATENT DOCUMENTS

| | | | |
|---|---|---|---|
| 3,077,684 A | 2/1963 | Gwinn | |
| 3,228,129 A | 1/1966 | Gwinn | |
| 5,145,211 A * | 9/1992 | McKillip | ............ 283/80 |
| 5,151,403 A | 9/1992 | Suzuki | |
| 5,318,817 A | 6/1994 | Ohno | |
| 5,366,249 A | 11/1994 | Diemert | |
| 5,395,687 A | 3/1995 | Ohno | |
| 5,411,294 A | 5/1995 | Diemert | |
| 5,670,225 A | 9/1997 | Yamanaka | |
| 5,871,829 A | 2/1999 | Nishizawa | |
| 6,099,927 A * | 8/2000 | Freedman | ...... B32B 38/0012 283/81 |
| 6,210,054 B1 * | 4/2001 | Adams | ............ B41J 11/46 101/288 |
| 6,221,448 B1 * | 4/2001 | Baetzold et al. | ............ 428/35.2 |
| 6,295,747 B1 | 10/2001 | Francis | |
| 6,303,201 B1 | 10/2001 | Baierl | |

(Continued)

FOREIGN PATENT DOCUMENTS

WO WO 0055832 A1 * 9/2000
WO WO 0056829 A1 * 9/2000
WO WO 2010021063 A1 * 2/2010

Primary Examiner — Frank D Ducheneaux
(74) Attorney, Agent, or Firm — Hedman & Costigan, P.C.; James V. Costigan; Kathleen A. Costigan

(57) ABSTRACT

A polymeric film tag stock which comprises;
(a) a layer of a polymeric film having a top surface and a bottom surface;
(b) a layer of a cohesive adhesive on the bottom surface of said polymeric film.

10 Claims, 2 Drawing Sheets

(56) References Cited

U.S. PATENT DOCUMENTS

| | | | |
|---|---|---|---|
| 6,844,079 B2* | 1/2005 | Holzer | B29C 55/023 |
| | | | 156/308.2 |
| 7,695,809 B1 | 4/2010 | Maksymkiw | |
| 2004/0007319 A1* | 1/2004 | Squier et al. | 156/277 |
| 2004/0109053 A1* | 6/2004 | Ray | 347/101 |
| 2007/0042142 A1* | 2/2007 | O'Brien | B32B 27/32 |
| | | | 428/32.34 |
| 2007/0243398 A1 | 10/2007 | Buchbinder | |
| 2010/0035057 A1* | 2/2010 | Ishida | 428/353 |
| 2011/0244162 A1* | 10/2011 | Honda | 428/42.2 |

* cited by examiner

SELF SEALING TAG STOCK

This application claims the benefit of Provisional Application Ser. No. 61/571,102, filed Jun. 21, 2011.

FIELD OF THE INVENTION

This invention relates to a novel self sealing non tacky tag stock that can be printed by conventional or electronic printing techniques that is a printable tear resistant synthetic material which is a single ply of polymeric film or a polymeric film laminate provided in, self wound roll or sheet form utilizing a cohesive adhesive layer that eliminates the need for a release paper liner.

BACKGROUND OF THE INVENTION

The present invention relates generally to printable and electronically imageable single ply synthetic tag materials that can be self sealed together using a bonding layer that only has an affinity to seal to itself and does not use a tacky (pressure sensitive) adhesive or release liner. An example is a thermally imageable baggage identification, routing and tracking tag made from a single ply of substrate that would replace the two and three ply structures that are used in the prior art. More specifically, the invention relates to a novel single ply baggage tag where only a single ply of polymer film or polymer film laminate may be used to form the baggage tag. This reduces cost, eliminates the hazard of release liners used with the tacky adhesives of the prior art and promotes environmental sustainability since less tree's will need to be harvested to manufacture paper liner while still providing a tag which resists tearing.

For example, large numbers of people are being transported today by bus, ship, and airplane. Generally, each of these passengers has one or more bags which travels with them to their destination. This necessitates a reliable means of identifying passengers' bags and destinations. In addition to being reliable, the process of tagging the bags must be done in as time efficient a manner as possible. There is nothing more frustrating for a passenger than to begin a trip by spending the first portion of the trip in a long line. Thus it is essential for the process to be as streamlined as possible, allowing the ticket agent to spend as little time as possible tagging the bag.

From a financial perspective, it is extremely expensive for an airline to lose a bag. Some estimates place the dollar cost to an airline at $1,000 for a lost bag, when the cost of replacing the bag is combined with the cost of delivering a bag (if found) and the loss of goodwill to the airline. The cost of the bag tagging system and the consumable tags used by the airlines are costly and savings can be realized by using the simple and efficient design of the current tags.

DESCRIPTION OF THE PRIOR ART

Baggage identification tags have been used for many years starting years ago with string tags where the tag was affixed to the bag with string and have evolved to multiple layer adhesive tags that have been electronically printed with a unique identifier for automatic handling and transfer processing through the automated baggage handling system, tracking and for security purposes where it can be automatically confirmed the tagged bag is on the aircraft with the passenger.

For example, one tag in use today is a 3 layer tag substrate that uses a face paper permanently laminated to a reinforcing layer of tear resistant material, pressure sensitive adhesive and a release liner layer. The tear resistant material can be Valeron, a highly tear resistant material or synthetic films such as polypropylene and polyester. Structures of this type are manufactured by Avery Dennison, Pasadena, Calif. Arctic Coatings, Concord, Ontario, Canada or Ricoh Electronics, Santa Anna, Calif. The tag substrate using the Valeron reinforcing layer which is a very tear resistant film has both good tear initiation and propagation resistance while the tag substrate using the polypropylene or polyester reinforcing layer has very good tear initiation resistance but poor tear propagation resistance once nicked.

Two ply tag substrate using a synthetic tear resistant film, pressure sensitive adhesive and release liner are manufactured by Print-O-Tape, Mundelein, Ill. or Ricoh Electronics, Santa Anna, Calif. The two ply structure typically uses a polypropylene face stock that has very strong tear initiation resistance but very poor tear propagation resistance once nicked.

In either two or three ply structure, the top ply of the tag comprises the surface on which the identification information is printed. Below the top ply of the two ply structure or below the second ply of the 3 ply structure is an adhesive layer used to connect the imaged ply to the paper liner which comprises the final ply.

Additional expense is incurred to manufacture the two and three ply tags of the current art. It is a primary objective of the present invention to provide a tag utilizing a one ply tag structure.

Nishizawa, T., U.S. Pat. No. 5,871,829, describes a pressure-sensitive adhesive label comprising as a surface material a microporous stretched resin film obtained by stretching a crystalline polyolefin resin film containing an inorganic fine powder, a pressure-sensitive adhesive layer provided on a back side of the surface material and a release paper provided on the pressure-sensitive adhesive layer. This invention is different from the present invention in that it used a tacky pressure sensitive adhesive and a release paper backing to prevent the pressure sensitive adhesive from sticking to other surfaces.

Yamanaka, M., U.S. Pat. No. 5,670,225, describes a uniaxially stretched multilayered film (synthetic paper) having tear resistance and printability, which comprises a recording layer bearing a bar code, a substrate layer, a self-adhesive layer, and a release paper layer. This invention requires a tear-resistant coextruded multi-layer film and release paper layer to cover what is described as a "self-adhesive" pressure sensitive adhesive layer that is tacky and will stick to other surfaces.

Ohno, A., U.S. Pat. No. 5,395,667, describes an air baggage tag readable by a bar code reader is composed of a recording layer, a substrate, a pressure sensitive adhesive layer, and release paper, wherein the substrate has a laminate structure composed of a fine void-containing stretched thermoplastic resin film and a substantially void-free uniaxially (mono-axially) stretched thermoplastic resin film. As with the above referenced patent, (U.S. Pat. No. 5,670,225), this invention requires a tear-resistant multi-layer film laminated with different types of films in a separate laminating step to create the complex product and release paper to cover the self-adhesive layer that is tacky and will stick to other surface.

Ohno, A., U.S. Pat. No. 5,318,817, describes an air baggage tag having excellent tear strength and printability. The invention relates to an air baggage tag readable by a bar code reader which is composed of a recording layer, a substrate, a self-adhesive layer, and release paper, wherein the substrate has a laminate structure composed of a fine void-containing stretched thermoplastic resin film and a substantially void-free uniaxially stretched thermoplastic resin film. As with the above referenced patent, (U.S. Pat. No. 5,395,667), this invention requires a tear-resistant laminated structure which adds a manufacturing step for laminating and release paper layer to cover what is described as a pressure sensitive self-adhesive layer.

Gwinn, M. B., U.S. Pat. No. 3,228,129 describes a compound baggage tag having detachable stubs, multiple layers of paper substrate in the form of a detachable overlay sheet over part of the base sheet that allows correlation of the detachable stubs with the tag. When written on by hand due to the transfer sheet between the overlay and base tag, the written image on the overlay sheet which covers part of the tag transfers to the base tag such as with a carbon paper type transfer sheet. Because of the additional detachable layer and overlay sheet, this invention could not be self-wound and process through an automatic printer such as a direct thermal printer, thermal transfer or laser printer because of the different thicknesses of the tag. The tag of this invention is described as a discrete separate tag that is manually imaged by hand and is not available in continuous feed formats for automatic on demand printing by print devices. Additionally, these tags made of paper and there is no part of the compound tag that makes it tear resistant. The self-stick latex adhesive that only sticks to itself is not designed to be applied to the entire length of the tag in the embodiment presented.

Gwinn, M. B., U.S. Pat. No. 3,077,684 describes baggage checks, and more particularly to baggage checks of the general type having a numbered tag which is adapted to be attached to an article of baggage when it is being shipped and a correspondingly numbered stub which is retained by the owner of the baggage to permit him to claim the baggage by matching the stub with the tag. The pre-printed tags made of paper have no component of the tag that makes it tear resistant or automatically on-demand printed. Additionally, it has crease lines in the transverse direction across the paper substrate to facilitate folding of the rigid paper. Our current on demand printable invention does not use crease lines which would weaken the durable plastic substrate. The self-stick latex adhesive is not designed to be applied to the entire length of the tag and there is no reference to creating attached tags in self wound form that can be continuously feed into a printer.

Maksymkiw, M., U.S. Pat. No. 7,695,809 describes a method of preparing adhesive coated articles and cold seal bonded laminates. The method creates a cohesive layer, only adhering to itself and tack free to the touch, which allows the coated substrates the option to be self wound. This invention does not provide the knowledge of whether it can be applied to a tear resistant synthetic material as all examples and claims reference medical grade paper. Cohesive adhesives coated onto paper penetrate the fiber and build a sufficient bond. Cohesive adhesives typically do not adhere well when directly coated onto synthetic film such as used in the current invention because there is no permeation of the film surface with the cohesive. Films used today with cohesive adhesives are typically used for packaging of ice cream, bakery and confectionary items where the cohesive adhesives poor adhesion is a feature of an easy open package.

Baierl, M., U.S. Pat. No. 6,303,201 describes a multiple layer baggage tag with tear resistance imparted to a tag of the invention by forming the liner of the tag from a tear resistant material. Only a portion of the liner is removed in order to apply tag to baggage. But if the un-removed portion of the liner does become separated from the tag, the strength of the tag is compromised and the tag will have adhesive exposed to stick to other items. In addition, there is still a portion of the liner that must be discarded.

Francis, D., U.S. Pat. No. 6,295,747 describes a device that provides a baggage tag attachable to the handle of a piece of baggage for displaying indicia of the identification and destination of a passenger owning the baggage. The multiple layer tag has a first or base ply and a second tear resistant ply or liner. The underside faces of the base ply and tear resistant liner are arraigned for engagement with one another. An adhesive is disposed between the base ply and the liner for releasably sealing them together. It is preferred that a release coating be applied to the underside face of the liner. Preferably, the Francis invention utilizes the flexible high tear strength cross-laminated polyethylene film with the trademark VALERON available from ITW, Houston, Tex. The release coating on the base ply or liner allows the removal of the liner from the adhesive layer, allowing the adhesive to remain with the base ply. The base ply and liner each have cuts proximate one end thereof defining a claim stub. Upon removal of the claim stub, a length of the underside face of the base ply adjacent the base ply cut is exposed with the adhesive permitting the two tag ends to be secured around a bag handle. As with the previous patent, if the un-removed portion of the liner does become separated from the tag, the strength of the tag is compromised and the tag will have adhesive exposed to stick to other items. In addition, there is still a portion of the liner that must be discarded.

Buchbinder, E., patent application Ser. No. 11/644,676 describes an invention relates to a 3-ply (paper or nonwoven)—film—(paper or nonwoven) laminate having special visible features which guarantee recognition and ant counterfeit security, e.g., copy protection, of the composite material. These laminates can be used, for example, for the production of documents, flight luggage tags, entry tickets, labels, pouches, packaging materials, large-format advertising images, bills or posters, packaging tapes, and wall coverings. In particular they are suitable for use as tear-resistant envelopes, without being restricted thereto. The laminate is readily printable on one or both sides by analogue or digital printing techniques, such as by offset printing, gravioprinting, direct thermal printing, thermal transfer printing, inkjet printing, electrophotography, and laser printing with solid or liquid toners, for example, the printing mode of choice being dependent on the selection of the papers or nonwovens which are employed. The films that are used give the laminates outstanding tear resistance. This invention describes the creation of a material that can be used for baggage tags and its strength but not about how it would be applied to the baggage itself.

Diemert, K., U.S. Pat. No. 5,366,249 and U.S. Pat. No. 5,411,294 describes in the case of a baggage tag, both the method of manufacture and the handling by the user must be considered as aspects of a complex system in combination with the product itself. An object of the invention is to develop a multiple layer baggage tag substrate wherein there are no parts coated with separating agent which must disposed of; wherein the production of individual tags is simplified; wherein the easy application of printing to the tag part, the control section, and possibly further parts is made possible; and, finally, wherein the handling of the baggage tag at the counter is simplified. But this invention is designed with multiple layers at different lengths placed at specific places on the part that becomes the baggage tag making it complex and costly to manufacture. It also incorporates a separating agent such as a silicone release coating and lower release ply.

Suzuki, A., U.S. Pat. No. 5,151,403 describes a multi layer thermal printing substrate using pressure sensitive adhesive having high mechanical strength, and a label and tag incorporating such a thermal printing medium. In additional to high mechanical strength, the thermal printing substrate of the present invention provides for excellent printing density and resolution, for which reason the substrate is very applicable to bar codes and the like. The thermal printing substrate which includes a multilayer structure consisting of a support substrate comprised of polyolefin type cross-laminate film; a thermal developing layer over the substrate comprised chiefly of colorless or lightly colored leuco-type dye and color developer agent; and a protective layer over the above mentioned thermal developing layer. This invention requires a separate peelable backing sheet to expose the adhesive layer when used as a baggage tag and is costly to manufacture because the cross laminated film requires a separate step to bias cut rolls to laminate them together before practicing any of the steps of the Suzuki invention.

SUMMARY OF THE INVENTION

According to the present invention, a single ply polymeric film or laminated polymeric tag substrate is provided which has a top surface and a bottom surface where the top surface is printable and the bottom surface has a cohesive adhesive which may be used to form a tag by attaching two ends of the surface having the cohesive adhesive to one another or one end of the surface having cohesive adhesive to another part of the surface having cohesive adhesive creating a loop with single ply extension to form a tag. By selection of the proper durable synthetic tag material, a durable tear resistant self adhering tag is provided at a reduced manufacturing complexity and raw material cost basis while allowing for novel economical tags to be used for applications such as baggage tags, horticultural tags, jewelry tags, produce banding tags, ski lift tickets, laundry tags and the like.

Accordingly, It is an object of the invention tp provide a tag stock that avoids a pressure sensitive adhesive that requires a disposable treated paper release liner.

It is also an object of the invention to provide tag stock in the form of rolls because the novel tag structure of the invention is thinner than the conventional tag stock which uses a heavy pressure sensitive adhesive and release liner to allow for less frequent roll changes. This is especially important for the pre-loaded automated check-in kiosks where there are many less airline employees than check in points.

The invention also includes tags which are made from the polymeric tag stock of the invention by attaching two ends of said polymeric tag stock together by contacting en end of an elongated section of the polymeric tag stock having a first and a second end where the cohesive adhesive surface layer of the first end is attached to the cohesive adhesive surface of the elongated section to form a loop. The ends can be affixed together or one end to the cohesive surface leaving an elongated section that if perforated, can be removed in sections to form a claim check, receipt or stub bearing information.

The invention also includes a method of making a tag which comprises:

(a) forming a polymeric tag stock into an elongated shape having a first end and a second end;

(b) fastening together the cohesive adhesive surfaces of said first end to the second end or surface leaving an exposed end together to form a tag.

The term elongated shape is used to mean a strip of polymeric tag stock shaped as a conventional airline baggage tag or vegetable bundle tag having a width of 1-4 inches and a length that is about five to ten times the width.

The substrate of the invention is made from a synthetic resin film that can be a mono-layer, a laminate layer that is made by adhesive bonding or by co-extrusion.

The side of the film substrate having the cohesive adhesive is used to adhere the substrate to itself in the form of a loop tag. The term cohesive adhesive is used herein to describe an adhesive that will only adhere to itself and is relatively tack free. The cohesive clings to other surfaces, but it will not leave a residue or surface contamination on surfaces other than those provided with the cohesive. This allows it to be self wound or cut into sheets and it will not stick to any item that the cohesive adhesive of the tag surface contacts. As used herein the term self wound means a roll of tag stock of the invention in the form of a jelly roll where the cohesive adhesive bottom surface releasably engages the printable top surface of the polymeric film with a adhesive bond that permits the unwinding of the roll with a minimum of force so that the self wound roll may be used to feed a conventional tag printing device. In a preferred embodiment, once the cohesive bond is established after a sufficient dwell time, if the material is separated from itself, the tag can not be reapplied since the adhesive will remain on the bottom of the tag stock.

Because of the tack free nature of the cohesive there is no need for a release liner to cover it and protect it from adhering to whatever it touches as is the case when a pressure sensitive adhesive used. The ability to manufacture a self adhesive tag without the use of a protective release liner eliminates several work place hazards and eliminates waste and cost. Work hazards that would be avoided are employees and/or clients slipping/tripping on liners that are not disposed of properly. The conventional release liners can make floors as slippery as a floor that is covered with banana peels because of the slippery silicone surface. In addition these release liners provide a fire hazard as they are combustible.

Additionally, many people get paper cuts from the release liners which is a common occurrence on removal of the release liner by hand when the tag is being prepared for application to an article.

The single layer substrate of the current invention is a tear resistant mono-layer or multiple layer laminate made by conventional adhesive lamination or by co-extrusion (all accomplished in one extrusion process) that is combined with a cohesive adhesive that only adheres to itself when pressed together with moderate pressure. In order to maintain the tear strength of the cohesive tag, the cohesive must be applied to a synthetic film. If applied to paper, the weak portion of the tag is the internal strength of the paper fiber which provides for a weak bond.

In a preferred embodiment, the cohesive adhesive can be printed with information, application directions or a registration mark for automatic printing and indexing through an on demand printer.

The material can not be easily torn and exhibits tear initiation resistance.

DETAILED DESCRIPTION OF THE INVENTION

Durable self seal single ply tag stock is produced without the use of a tacky pressure sensitive adhesive by combining a durable synthetic polymer film y with a cohesive adhesive that only adheres preferentially to itself. The tags can be printed by conventional means or by computer generated digital techniques such as thermal printing. The tag stock can be wound in rolls or provided in sheets and provide an economic savings because no tacky adhesive or second ply release liner is needed.

Figure 1:
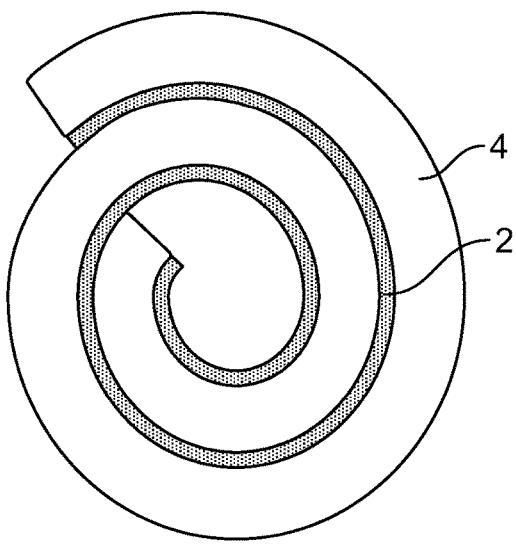
FIG. 1 is a side view of a self-wound roll of tag stock according to the invention.
Figure 2:
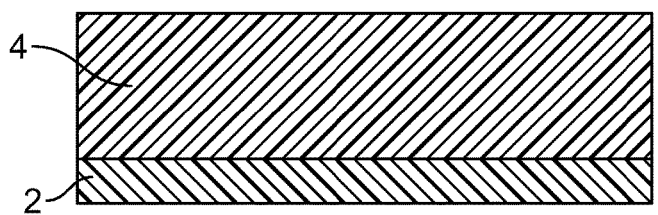
FIG. 2 is a cross section of tag stock according to the present invention that is made with a single ply of polymer film.
Figure 3:
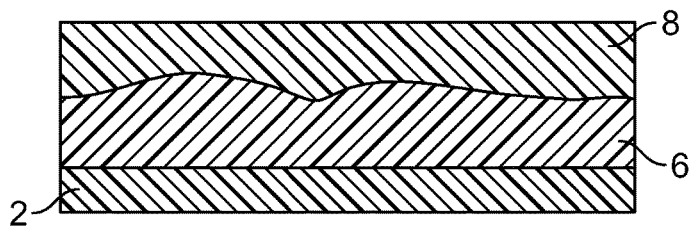
FIG. 3 is a cross section of tag stock according to the present invention that is made with a coextruded polymer film.
Figure 4:
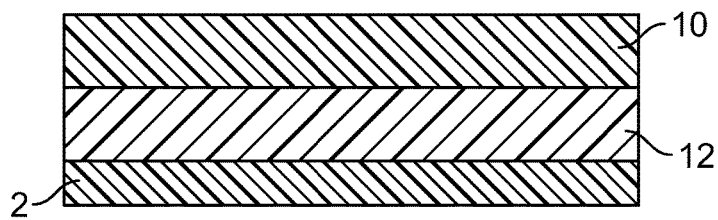
FIG. 4 is a cross section of tag stock according to the present invention that is made with a polymer film laminate.
Figure 6:
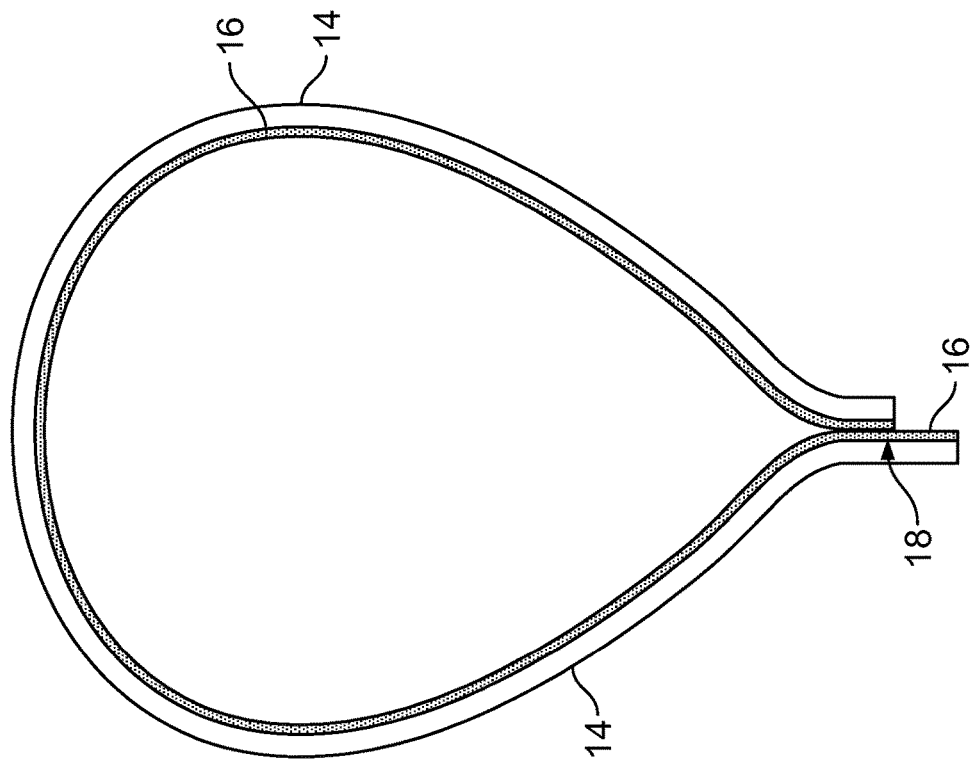
FIG. 6 is a perspective view of a loop tag with an extended end made from polymeric tag stock having an elongated shape.
Figure 5:
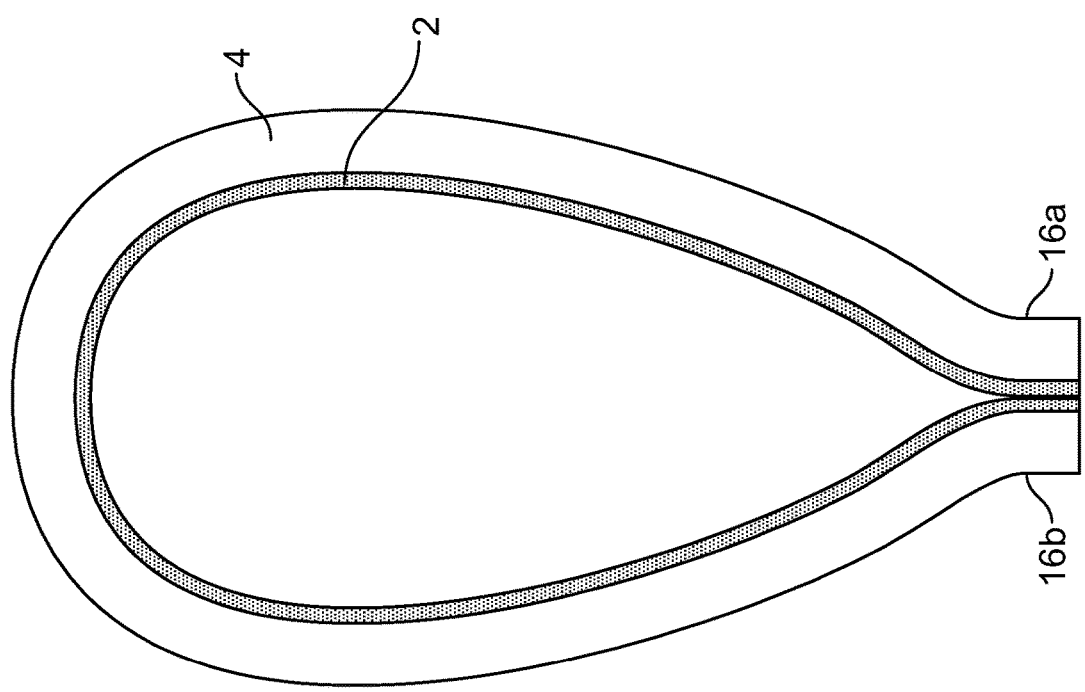
FIG. 5 is a perspective view of a baggage tag made from polymeric tag stock having an elongated shape.

FIG. 1 is a end view of a self wound roll of the polymeric film tag stock of the invention. The cohesive adhesive layer 2 is on the inside of the "jelly roll" configuration and the polymer film 4 is on the outside. FIG. 2 is a cross-section of polymeric film tag stock according to the invention which shows the cohesive layer 2 on the polymeric film 4. FIG. 3 is a cross-section of a schematic of a polymeric film tag stock which shows a coextruded polymeric film with polymers 8 and 6 and a layer of cohesive 2 on one side. FIG. 4 is a cross-section of a polymeric film tag stock which has a print receiving layer 10, a single polymer film layer 12 and a cohesive layer 2. FIG. 5 is a side view of a baggage tag of the invention which shows the ends 16a and 16b of the cohesive layer in contact with one another. FIG. 6 is a side view of a baggage tag of the invention having a polymeric film layer 14 and a cohesive layer 16 where one end of the elongated polymeric tag stock used to make the baggage tag has perforations 18 on one end that permit that end to torn off when it is extended past the other end before contacting the cohesive ends and form a separated end piece. This structure allows for the printing of indicia on the end piece so that it may serve as a receipt for the baggage. If desired, more than one section may defined by perforations to permit the making of more than one tear off section.

The synthetic polymer film can be manufactured from any of the various resins that are typically used to manufacture resin films such as polyester, polypropylene, polyethylene, polystyrene, vinyl, polylactic acid (PLA), acrylic and polycarbonate. The synthetic ply can be clear, white or colored in thickness ranges from 0.001 mil to 25 mils and preferably from 0.002 mils-0.010 mils. The synthetic ply can be mono layer or multiple layer co-extrusions of the aforementioned types of resins and can be manufactured using common film extrusion processes such as blown, cast, calendared, mono axially oriented, bi-axially oriented or skived film.

Preferably, the base film is a co-extruded micro-voided or cavitated multi-layer white bi-axially oriented polypropylene film in the range of 0.002 mils-0.007 mils such as 150LL302 from the Films Division of ExxonMobil Chemical, Macedon, N.Y. that is a nominal 0.0026 mils white cavitated polypropylene that is economical and provides for excellent tear initiation resistance. Tear initiation resistance for purposes of this specification is the ability of the film to withstand initially tearing. This coextruded film is made of co-extruded polypropylene film that is formed with a microvoided core with solid skins around the core.

Most preferable for tag applications is M. V. White Micro Voided Reduced Density Polyolefin film available from Trico Industries, Inc, Warehouse Point, R.I. This resin film is a white machine direction oriented micro-voided polyolefin film available in various gauges. Tear resistance properties are critical for tags across the machine direction since they are typically sealed end to end in the machine direction to form a loop to be affixed to an object such as a tree limb or baggage handle. This type of film has excellent tear initiation resistance as described above and superior tear propagation resistance across the web direction because it is perpendicular to the axis of orientation of the film. This will allow for extremely durable tags. Special mention is made of using cross-laminated high strength films as referenced in the Suzuki and Francis prior art as a single layer web as defined by this invention. For outdoor use, vinyl film should be used or other resins can be formulated with ultra-violet ray blockers and inhibitors. Tinuvin, available from BASF, Tarrytown, N.Y. can be incorporated into the film to increase the outdoor functional life of a tag such as a horticultural nursery tag.

While not limiting the scope, while cast, blown and calendared films can be used but mono and bi-axially oriented films are preferred because of the stiffness and high tensile strength imparted by the orientation. This is especially important for roll fed applications where the film is pulled or pushed through a printing device. It is preferred to corona, flame or plasma treat the surface of any film that the cohesive adhesive will be applied to if it is applied by a coating process.

Optionally, a print receiving layer can be one of the co-extruded layers or it can be a coated layer. If coextruded, the thickness of the layer can be from 1-12 microns thickness. An example of a coextruded layer is the S-556 print receptive skin layer provided on the M.V. White Microvoided Reduced Density Polyolefin film from Trico Industries. If a coated layer, the coat weight can vary from 0.2-20 grams/MSI (MSI=1000 sq. in.) applied on the top surface of the polymer film. Examples of print receiving layers are set forth hereafter.

General purpose acrylic print primer BP9050 available from Process Resources Corp, Thornwood, N.Y. at 0.25-1.5 gram/MSI coat weight.

Ink Jet receptive coating IJ70 available from Esprit Technologies, Sarasota Fla. at 10-14 grams/MSI coat weight.

Thermal Transfer receiver coating PD101P available from Process Resources Corp., Thornwood, N.Y. at 0.5-2.0 grams/MSI coat weight.

Thermally imageable coating 8952 available from NuCoat Inc., Plymouth, Mich. at 2.5-4 grams/MSI coat weight.

According to the present invention, the material that is used as a self adhering tag utilizing a single ply structure with a cohesive adhesive on one side of the single ply is folded so that a surface with the cohesive adhesive layer contacts a surface with the same cohesive adhesive layer to form an interfacial bond between two layers of the cohesive adhesive. In contrast to the prior art durable tags that are multiple layers of paper, synthetic film or a combination with a tacky pressure sensitive adhesive and liner, this invention is a durable single ply or layer of substrate with cohesive on one side that is used as the adhering mechanism when arranged in contact with itself. For purposes of this invention, a cohesive adhesive is defined as a natural or synthetic compound or blend of compounds applied as a coating to the single ply substrate or applied as part of a co-extrusion process in the manufacture of the single ply substrate that has the property of being relatively tack free and will only bond to itself. While the cohesive may cling to other surfaces under pressure, it has the property of separating cleanly from unlike surfaces without adhering or leaving residue or any contamination. For purposes of this invention, in addition to clean separation without residue or contamination, the force to separate or de-block a cohesive layer from an unlike surface is defined as <8 avoirdupois ounces/in. of width and preferably <3 avoirdupois ounces/in. of width for roll materials that are run through a print system in roll form.

The cohesive of this invention has strong adhesive attraction forces and will stick or stay together due to the intermolecular attraction between like molecules of the same substance that act to unite them. The cohesive does not have adhesive forces to surfaces other than itself. Adhesion for purposes of this specification is the attraction between unlike molecules that forms a bond that can not be easily separated and will adhere together and will leave residue or contamination when pulled apart with force. Mechanical adhesion of the cohesive occurs when the adhesive is applied to and flows into the microstructure of the surface such as when applied to paper where it flows into the porous fibrous structure. On film substrates that are not porous, cohesive adhesives are used for non durable packaging applications that require bonding strong enough to hold the package together to protect the product from contamination but easy to open such as bakery bags, confectionary product wrappers, single serve ice cream packages, etc. This type of cohesive adhesion on film is not acceptable for many of the durable tag applications contemplated by the present invention such as horticultural tags, vegetable wrapper tags, baggage tags, jewelry tags, ski lift tickets etc.

In a preferred embodiment, a coated or co-extruded tie layer is used to increase the adhesion of the cohesive to the durable resin film ply layer. The tie layer can be a compound that provides enhanced specific adhesion that enhances bond by molecular attraction between the surface of the tie layer and cohesive or through mechanical adhesion where the tie layer is porous where the cohesive will flow into it and mechanically bond. Preferably, a tie layer combing both specific and mechanical adhesion is used such as PR200, a micro-porous synthetic resin available from Process Resources Corp, Thornwood, N.Y. that combines chemical attraction to acrylic containing cohesive adhesives and porosity for mechanical bonding. The tie layer can have a coat weight of 0.1-2.0 grams/MSI (thousand square inches) and may contain microporous non ionic polyurethane blended with acrylic resin. The cohesive adhesive can be based on synthetic or natural resins or a combination such as CoStick NS620 available from Dyna-Tech Adhesives & Coatings, Grafton W. Va. which is a blend of natural latex and synthetic resin, namely and (the blend is proprietary to Dyna-Tech) or CS-741 which is available from PB Adhesives, Levittown, Pa. which contains Low Ammonia Natural Latex and styrenated acrylic resin with a Tg of 19° C. in a 2:1 ratio based on dry weight along with Kaolin Clay to detacify the surface.

The cohesive adhesive layer may be applied at a coat weight of 1.5-12 grams/MSI and preferably at a coat weight of 3-7 grams/MSI and most preferably at at 4-6 grams/MSI to achieve a strong peel bond.

In order to have a sufficient bond for a durable tag application, the bond strength of the cohesive when sealed to itself must be greater than 10 avoirdupois ounces per inch of width when peeled at 180 degrees after 24 hour dwell and most preferably greater than 15 avoirdupois ounces per inch of width for applications such as produce wrap tags, baggage tags and jewelry tags. Most preferably, the cohesive layer bond to itself will be greater than 18 ounces per inch of width. The operating temperature range of the cohesive should be as broad as possible after sealing at room temperature for applications such as a nursery tag that will see the change of seasons or a baggage tag that can start on a hot tarmac in Houston and end up in Alaska. A range of −40 to 200 degrees F. is preferred.

Specific mention is made of a surprising tamper evident feature of the product where the adhesion of the cohesive to the base is strong enough for a durable application >10 avoirdupois ounces/inch but where the cohesive releases from one side of the bonded surfaces under forces of shear when being separated where all the adhesive goes to one side of the substrate that can not be reattached again. The release forces may be measured as described in PSTC-1 (Pressure Sensitive Tape Council) Peel Adhesion of Single Coated Pressure Sensitive Tapes at 180° Angle). The combination of PR200 from Process Resources Corp. and CS-741 from PB Adhesives as specified above when applied to the Trico MV single ply film substrate produces a product that functions in this manner.

The tag stock of the present invention can be converted into self wound rolls that are perforated or die cut into a final shape or size that are connected by perforations that can be easily separated when needed but are strong enough to process through printing devices without pre-fracturing or separating.

Because of the non adhesion building nature of the cohesive, there is no need for a release liner to cover it and protect it from adhering to whatever it touches. The ability to manufacture a self adhesive tag without the use of a protective release liner eliminates several work place hazards and eliminates waste and cost. Work hazards that would be avoided are employees and/or consumers slipping/tripping on liners that are not disposed of properly and are on the floor when the throw away portion of the release liner with slippery silicone surface are discarded improperly. Many users sustain paper cuts which is a common occurrence on removal of the release liner by hand to apply it when using a tacky pressure sensitive adhesive.

Optionally, the non cohesive surface of the single ply durable resin film can be enhanced for printing or imaging. This enhancement can come in basic forms such as corona, flame or plasma treatment in line with extrusion of the film to raise the dyne level of the surface and promote adhesion or it can be the co-extrusion of a bonding layer or application of a coated layer. The coated print receiving layer may be 0.2 to 20 grams/MSI coat weight and can be an acrylic print primer or it can be a formulation tailored for specific types of printing technologies such as a leuco dye direct thermal imaging layer, thermal transfer receiver coating, ink jet printable receiver coating or laser toner receiver. Examples of these Protective overcoats which can be used after printing of constant information such as a logo or company name to enhance durability of the printed image and/or reduce the blocking tendency of the cohesive to the printed surface when under pressure wound tight in a roll or in stacks of sheets may apply a coating before on demand printing such as NeoRez 9649 Polyurethane Dispersion from DSM Neo Resins which may be applied at a level of 0.2 to 4 grams/MSI Or Flexcon varnish available from Flint Ink at 0.25-2.0 grams/MSI coat weight.

As noted above, the use of a print receiving surface on the polymeric film tag stock is well known for use in airline baggage tags that are on demand printed utilizing a thermally imageable coating on one side of oriented film or paper film laminates with pressure sensitive adhesive on the other side of the structure. The current products in use today at airport check in counters and kiosks are direct thermally imageable tag composites that are either a three ply structure with paper laminated to a reinforcing sheet that has pressure sensitive adhesive and liner or a two ply structure using white oriented polypropylene with pressure sensitive adhesive and liner. The polypropylene has good tear initiation resistance but poor tear propagation resistance when nicked. The machine direction oriented cohesive polypropylene is tear propagation resistant providing a better product to the airlines, is lower cost to manufacture in single ply form, provides for labor savings because there are less changes of stock in the printers because the structure is thinner and there are more tags in a roll or stack.

Optionally, the tag converter that converts master rolls of material into pre-printed tags with constant information such as a logo or company name and that die cuts or perforates the stock into individual tags may choose to apply an anti-cling top coating such as the Flexcon varnish referenced above.

Additionally, tamper slits can be incorporated into the substrate during conversion that will enhance destruction of the polymeric layer on attempted separation of the cohesively sealed layers after a dwell time.

An example of a polymeric film tag stock according to the invention is as follows:
Optional durability/anti-block protective Flexcon varnish
Thermal Receiver Coating—NuCoat 8952 3.5 grams/MSI coat weight
3.2 mil M.V. White Micro Voided Reduced Density Polyolefin with S-556 print receptive surface layer
PR200 0.25 grams/MSI coat weight
CS-741 4.5 grams/MSI coat weight

The invention claimed is:

1. A polymeric film tag stock which comprises;
   (a) a polymeric film layer selected from the group consisting of a coextruded polymer film and a polymer film laminate, said coextruded polymer film and said polymer film laminate having a top surface and a bottom surface, wherein said top surface is a polymer film layer having a top solid surface and said bottom surface is a polymer film layer having a bottom solid surface;
   (b) a cohesive adhesive layer on said bottom solid surface of said polymeric film layer where said cohesive adhesive is at least continuously present along an edge of said bottom solid surface where said polymeric film tag stock has an elongated shape with a first end and a second end at each end of a longest portion of said elongated shape, where a loop tag is formed from said polymeric film tag stock by attaching said first end and said second end at each end of said longest portion of said elongated shape, said tag having a part of said first end of said polymeric film tag stock having an elongated shape attached to a part of said second end of said elongated polymeric film tag stock where a part of the cohesive adhesive layer at said first end is attached to a part of the cohesive adhesive layer at said second end to form a cohesively sealed layer.

2. The polymeric film tag stock as defined in claim 1 where said (a) polymeric film layer is a coextruded polymer film having a top surface and a bottom surface, wherein said top surface is a polymer film layer having a top solid surface and said bottom surface is a polymer film layer having said bottom solid surface.

3. The polymeric film tag stock as defined in claim 1 where a tie layer that provides enhanced specific adhesion is provided between the (a) polymeric film layer and the cohesive adhesive layer.

4. The polymeric film tag stock as defined in claim 1 where a print receiving layer is provided on the top surface of the (a) polymeric film layer.

5. The polymeric film layer tag stock as defined in claim 1 where the polymeric film tag stock is provided with tamper slits to enhance destruction of said (a) polymeric film layer on attempted separation of said cohesively sealed layer, after a dwell time, from said layer of cohesive adhesive.

6. The polymeric film tag stock as defined in claim 5 wherein the cohesively sealed layer has a removable segment which is a claim check or a receipt.

7. The polymeric film tag stock as defined in claim 1 where said (a) polymeric film layer has a thermally imageable top surface and a bottom surface having a coat layer of said cohesive adhesive on the bottom solid surface of said polymer film layer where a coat weight is 1.5 to 12 grams /MSI.

8. The polymeric film tag stock as defined in claim 6 where the polymeric film tag stock has perforations that allow for removal of a section from a self-wound roll before said loop tag is formed.

9. A tag which is made from the polymeric film tag stock of claim 1 where said polymeric film tag stock has an elongated shape with a first and a second end at each end of a longest portion of said elongated shape, said tag having a part of said first end of said polymeric film tag stock having an elongated shape attached to a part of said second end of said elongated polymeric film tag stock where a part of the cohesive adhesive layer at said first end is attached to a part of the cohesive adhesive layer of the second end.

10. A polymeric film tag stock which comprises;
    (a) a single ply of polymer film, said single ply of polymer film having a top surface and a bottom surface,
    (b) a cohesive adhesive layer on said bottom surface of a polymeric film layer where said cohesive adhesive is at least continuously present along an edge of said bottom surface, said polymeric film tag stock having an elongated shape with a first end and a second end at each end of a longest portion of said elongated shape, where a loop tag is formed from said polymeric film tag stock by attaching said first end and said second end at each end of said longest portion of said elongated shape, said tag having a part of said first end of said polymeric film tag stock having an elongated shape attached to a part of said second end of said elongated polymeric film tag stock where a part of the cohesive adhesive layer at said first end is attached to a part of the cohesive adhesive layer at said second end to form a cohesively sealed layer.

* * * * *